USOO5656870A

United States Patent [19]
Turnbull

[11] Patent Number: 5,656,870
[45] Date of Patent: Aug. 12, 1997

[54] CURRENT CONTROL FOR SUPERCONDUCTING MAGNETIC ENERGY STORAGE SYSTEM

[75] Inventor: Fred Gerdes Turnbull, Scotia, N.Y.

[73] Assignee: Intermagnetics General Corporation, Latham, N.Y.

[21] Appl. No.: 509,991

[22] Filed: Aug. 1, 1995

[51] Int. Cl.[6] .................................................. H02J 3/06
[52] U.S. Cl. ......................... 307/64; 307/66; 307/45;
307/109; 323/360; 363/14; 363/74; 363/75;
363/59; 362/62; 320/1
[58] Field of Search .................................. 307/66, 64, 22,
307/45, 109; 323/360; 363/14, 75, 59, 62,
74; 320/1

[56] References Cited

U.S. PATENT DOCUMENTS

| | | | |
|---|---|---|---|
| 4,122,512 | 10/1978 | Peterson et al. | 363/14 |
| 4,599,519 | 7/1986 | Boenig | 307/22 |
| 4,962,354 | 10/1990 | Visser et al. | 323/360 |
| 5,041,959 | 8/1991 | Walker | 363/79 |
| 5,091,840 | 2/1992 | Walker | 363/96 |
| 5,159,261 | 10/1992 | Kim et al. | 323/360 |
| 5,181,170 | 1/1993 | Huang et al. | 363/21 |
| 5,194,803 | 3/1993 | Visser et al. | 323/360 |

Primary Examiner—William M. Shoop, Jr.
Assistant Examiner—Albert W. Paladini

[57] ABSTRACT

A superconducting magnetic energy storage system for applying power to a load includes a superconducting magnet, the inductor of which is supplied with current via a source which may be preset to a desired value of current, and wherein a feedback loop responsive to a sensed current adjusts the source to provide the desired current. Energy from the superconducting magnet is transferred via a series of pulses of current from the magnet to a first capacitor for charging the capacitor to a desired voltage greater than the voltage at the superconducting magnet. A further transfer of energy, via a series of pulses of current, results in a charging of a second capacitor to a voltage lower than the voltage of the first capacitor. The second capacitor feeds the load. A switch disposed in a current recirculation path through the magnet is operated cyclically to divert increments of current from the magnet to the first capacitor, and a second switch is operated cyclically to provide pulses of current from the first capacitor to the second capacitor. A diode is disposed in the current path between the magnet and the first capacitor. An inductor is disposed in the current path between the first capacitor and the second capacitor. This arrangement of the components provides for an efficient transfer of power from the magnet to the load.

13 Claims, 4 Drawing Sheets

CURRENT CONTROL FOR SUPERCONDUCTING MAGNETIC ENERGY STORAGE SYSTEM

BACKGROUND OF THE INVENTION

This invention relates to the control of current in the inductor or coil of a superconducting magnet which serves as a store of magnetic energy to be used, by way of example, as a back-up source of electric power in an uninterruptable power supply (UPS). More particularly, the invention relates to the use of gating circuitry for direction of current flow through the inductor and for control of average current and voltage at the inductor, wherein a charging and a discharging of energy of the magnet is accomplished via a series of voltage-step-up and step-down chopper circuits with outputting of electric power by successive capacitive energy storage cells.

A superconducting magnet comprises a coil or inductor of a superconducting material, and can serve as a useful storage of energy in the form of a magnetic field produced by a flow of electric current in the inductor. An example of an energy storage system incorporating a superconducting magnet is a UPS, wherein electric power is applied to a load by a public utility, the electric power company, and wherein the electric power for the load is withdrawn from the stored magnetic energy of the superconducting magnet during a malfunction in the supply of the utility power. Typically, in the construction of a superconducting magnetic energy storage system (SMES), various electrical circuits are employed for charging the magnet with current, maintaining a desired level of current in the magnet and extracting current from the magnet when back-up power is required for the load.

Examples of circuitry employed for control of current in a superconducting magnet are provided by the U.S. Pat. Nos. 4,962,354 and 5,194,803 of Visser et al and 5,159,261 of Kim et al. These patents disclose the interconnection of a superconducting magnet with an energy storage cell by means of switching circuitry, and wherein the output of the energy storage cell is to be applied to a load. A problem arises in that the circuits of the foregoing patents are unduly complex and, therefore, may not be optimum in terms of efficient use of the electrical components.

SUMMARY OF THE INVENTION

The aforementioned problem is overcome and other advantages are provided by a superconducting magnetic energy storage system wherein current control for an inductor of the superconducting magnet is provided, in accordance with the invention, by use of a voltage step-down chopper circuit at an input to the magnet and a voltage step-up chopper circuit at an output of the magnet. The step-up chopper circuit connects with a first energy storage cell in the form of a first capacitor wherein a voltage induced across the capacitor by current output from the unit produces a larger voltage than that provided on an input power supply bus to the step-down chopper circuit. A further voltage step-down chopper circuit connects with the first energy storage cell and bleeds off current from the energy storage cell via an inductor to a second energy storage cell constructed as a second capacitor. The voltage across the second storage capacitor is made available by a diode to a load. Control circuitry responsive to inductor current and the voltages across the first and the second capacitors is operative to select a suitable pulse duty cycle for each of the respective chopper circuits, and also to control a supply of current to the magnet for maintaining a desired average value of current.

BRIEF DESCRIPTION OF THE DRAWING

The aforementioned aspects and other features of the invention are explained in the following description, taken in connection with the accompanying drawing wherein.

Identically labeled elements appearing in different ones of the figures refer to the same element in the different figures but may not be referenced in the description for all figures.

DETAILED DESCRIPTION

Figure 1:
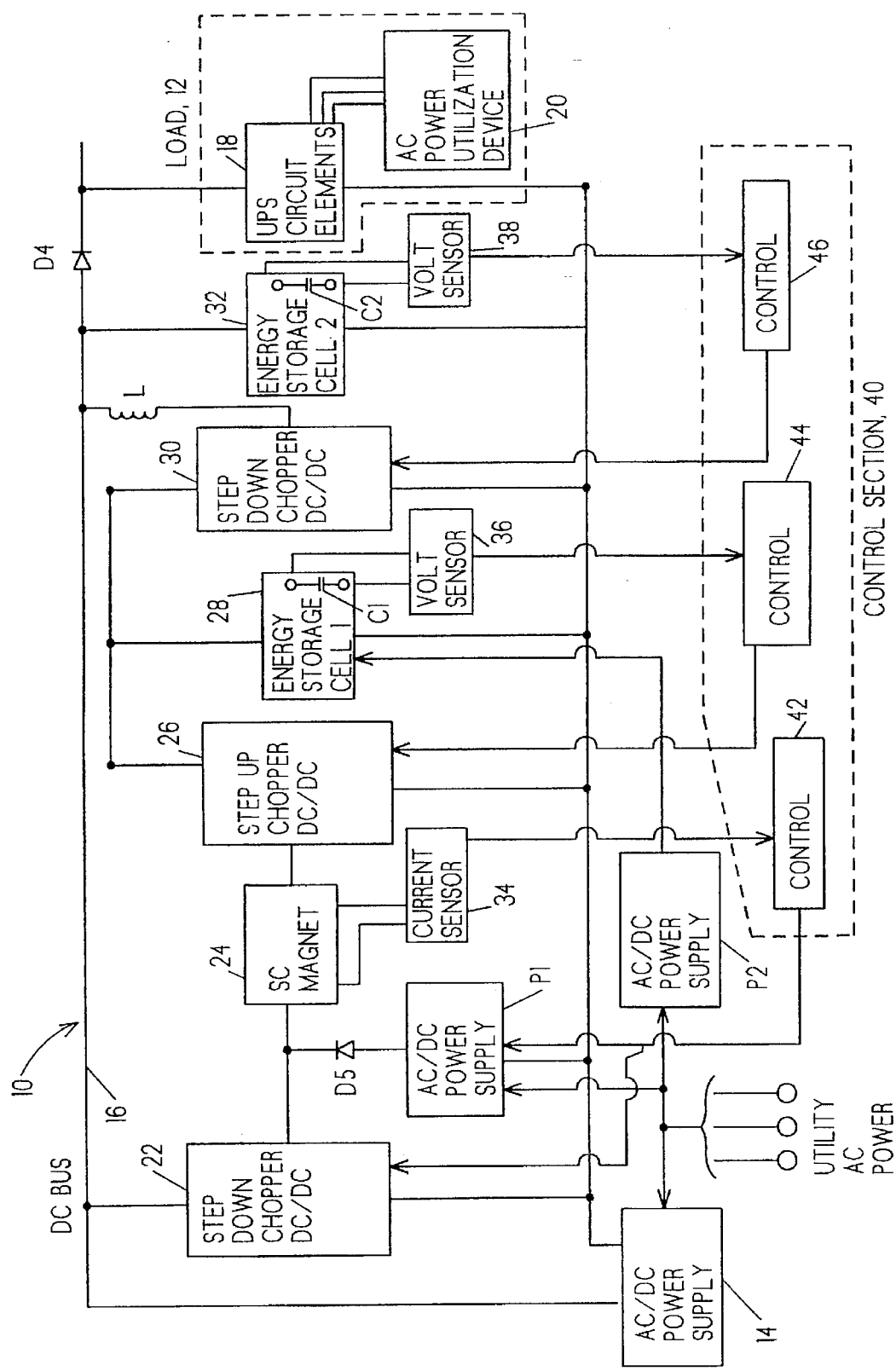
FIG. 1 is an overall block diagram of a superconducting magnetic energy storage system of the invention showing various circuits for control of current applied to and extracted from a superconducting magnet.

FIG. 1 shows a system 10 for providing superconducting magnetic energy storage wherein stored energy of the system 10 is available for providing power to a load 12. By way of example in the use of the system 10, the system 10 is employed with components of a UPS wherein an input power supply 14 provides a conversion from utility AC (alternating current) power to DC (direct current) power outputted on a DC bus 16. Other components of the UPS circuit, as will be described hereinafter, including DC-to-AC conversion, are included in a circuit segment 18 shown as part of a load 12. Also included within the load 12 is an AC power utilization device 20 such as a computer or other critical AC load, receiving AC power outputted by the circuit segment 18. AC/DC power supplies identified as P1 and P2 are included within the system 10, and receive input AC power from the utility and convert the AC power to DC power for use by components of the system 10 as will be described hereinafter.

The system 10 further comprises a step-down DC/DC chopper 22, a superconducting (SC) magnet 24, a step-up DC/DC chopper 26, a first energy storage cell 28, a step-down DC/DC chopper 30, and a second energy storage cell 32. In the storage cells 28 and 32, the storage elements are respectively capacitors C1 and C2 as identified also in FIGS. 2–4. As will be described in further detail hereinafter, both the chopper 22 and the power supply P1 provide current for charging the magnet 24, the supply P1 being connected by a diode D5 to the magnet 24. Output current from the chopper 30 is coupled to the capacitor C2 of the second storage cell 32 by an inductor L as will be described in further detail with reference to FIGS. 2–4. Power outputted by the second energy storage cell 32 is coupled by a diode D4 to the load 12.

A current sensor 34 senses current flowing within the magnet 24, a voltage sensor 36 measures voltage across the capacitor C1 of the first energy storage cell 28, and a voltage sensor 38 measures voltage across the capacitor C2 of the second energy storage cell 32. Also included within the system 10 is a control section 40 comprising three controllers 42, 44, and 46. Each of the controllers 42, 44, and 46 includes well known circuitry (not shown) comprising an oscillator generating pulses for driving semiconductor gates, and pulse-width modulation circuitry for establishing a desired duty cycle to the pulses for operation of the semiconductor gates. The controller 42 is responsive to current sensed by the sensor 34 for driving the supply P1 to produce a desired current for the magnet 24. In similar fashion, the controller 42 drives the chopper 22 during a charging mode of the magnet 24. The controller 44 is responsive for the voltage sensed by the sensor 36 for driving the chopper 26. The controller 46 is responsive to the voltage sensed by the sensor 38 for driving the chopper 30.

In the operation of the system 10, the various power electronic and passive circuits provide control of the magnet 24 with respect to the charging current, the maintaining current and the discharging current of the magnet 24. The magnet 24 is charged by increasing the current using the step-down chopper 22. The average voltage applied to the magnet 24 is controlled by the duty cycle of operation of a power electronic switch (identified as switch GTO3 in FIG. 2) in the step-down chopper 22. The magnet current is maintained by the AC/DC power supply P1 which maintains the magnet current at a set level with sufficient voltage to overcome the semiconductor and resistor voltage drops in the magnet circuit, as will be disclosed in further detail hereinafter with reference to FIG. 2. Diode D5 blocks the high instantaneous voltage, during the step-down operation of the chopper 22, from providing excess voltage on the AC/DC power supply P1.

The magnet is discharged by decreasing the current using the step-up chopper 26. The average discharge voltage on the magnet 24 is controlled by the duty cycle operation of a power switch (identified as switch GTO1 in FIGS. 2–4) in the step-up chopper 26. The step-up voltage level appears across the capacitor C1 of the first energy storage cell 28. The capacitor C1 is precharged to a desired average magnet discharge voltage. This voltage level across capacitor C1 is higher than the DC voltage at bus 16 in order to reduce the maximum value of current in the magnet 24.

The voltage outputted by the first energy storage cell 28 is reduced by the action of the step-down chopper 30. The average output voltage from the chopper 30 is controlled by the duty cycle in the operation of a semiconductor switch (identified as switch GTO2 in FIGS. 2–4) in the step-down chopper 30. The voltage outputted by the chopper 30 is filtered by the inductor L and the capacitor C2 of the second energy storage cell 32. The voltage outputted by the second energy storage cell 32 is regulated by operation of the chopper 30, to overcome the voltage drop of the diode D4 for supplying current to the load 12. The specification on charging time of the magnet 24 determines the duty cycle for the step-down chopper 22 during the charging mode of the magnet 24. The level of magnet current also serves as the feedback signal, outputted by the sensor 34, for the closed loop control of the AC/DC power supply P1 during the mode of current operation of maintaining the current in the magnet 24. Also, the voltage to be outputted by the first energy storage cell 28 establishes the requisite duty cycle of the step-up chopper 26. Similarly, the voltage to be outputted by the second energy storage cell 32 establishes the requisite duty cycle for operation of the step-down chopper 30.

Figure 2:
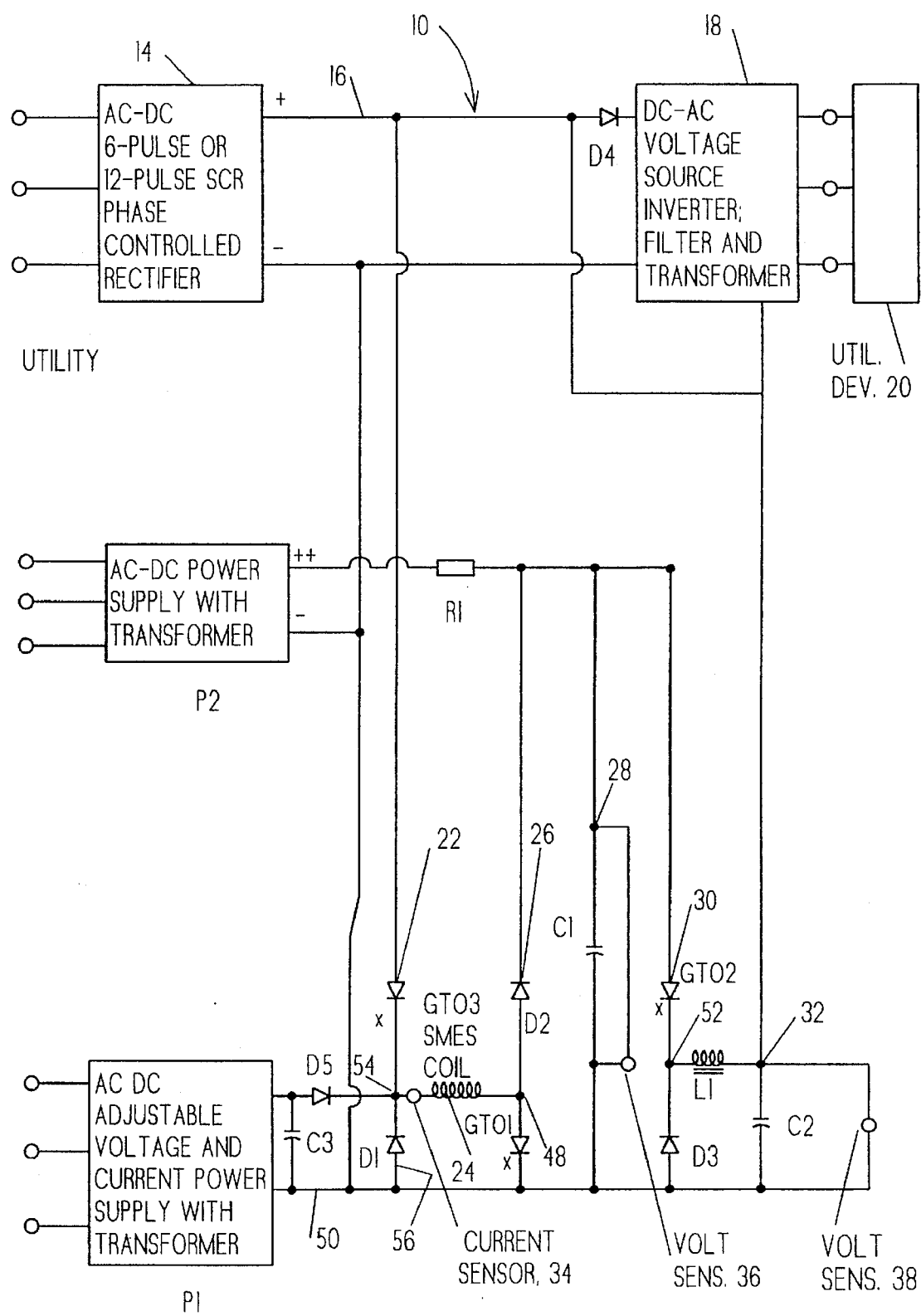
FIG. 2 shows details in the construction of circuitry for the system of FIG. 1 in accordance with a first embodiment of the invention.
Figure 3:
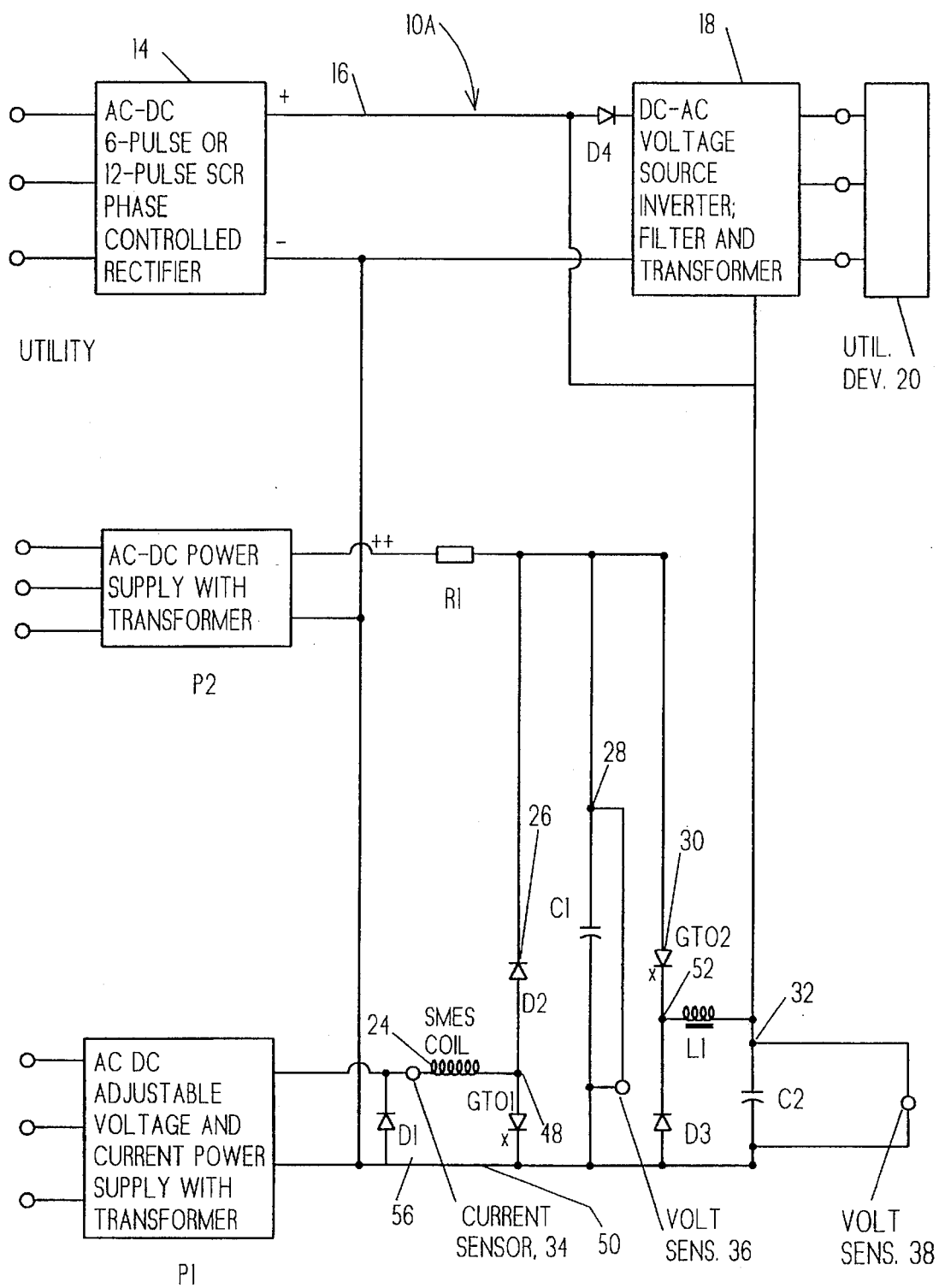
FIG. 3 shows details in the construction of the circuitry of FIG. 1 in accordance with a second embodiment of the invention.
Figure 4:
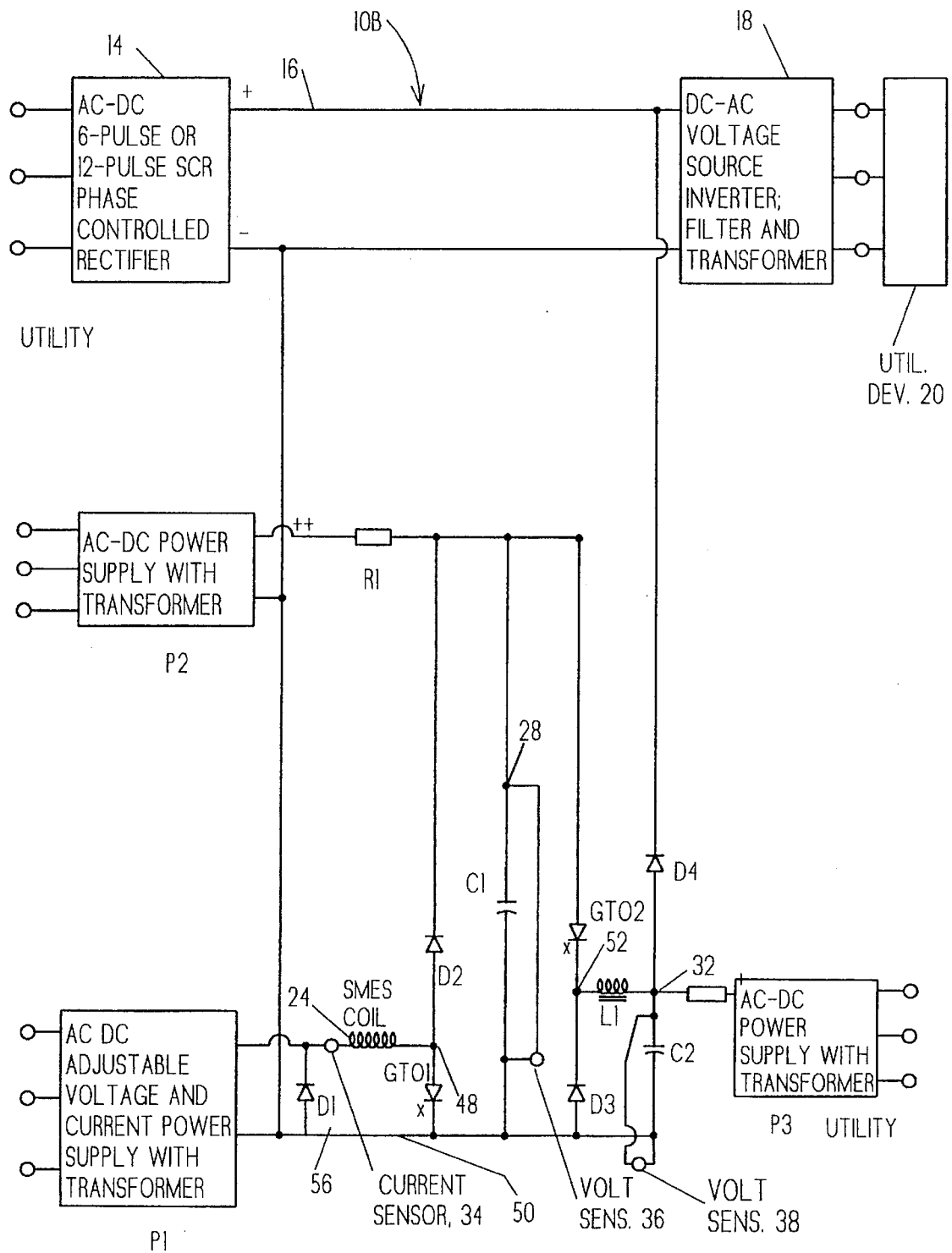
FIG. 4 shows details in the construction of the circuitry of FIG. 1 in accordance with a third embodiment of the invention.

FIG. 2 shows further details in the construction of the system 10 of FIG. 1. FIG. 3 shows details in the construction of a system 10A which is an alternative embodiment of the system 10 portrayed in FIG. 2. FIG. 4 shows details in the construction of a system 10B which is a further embodiment of the system 10 depicted in FIG. 3. Much of the details in the construction of the embodiments of FIGS. 2–4 is the same for each of the embodiments and, accordingly, in the initial description of the embodiments of FIGS. 2–4, these three figures are described together.

FIGS. 2–4 show the UPS supply 14 and the UPS circuit segment 18 with the interconnecting bus 16, the elements having been disclosed hereinabove with reference to FIG. 1. Supply 14 is an AC/DC supply operative with a six pulse or a twelve pulse SCR (silicon control rectifier) operative with phase control. The circuit segment 18 includes a DC/AC voltage source, an inverter, a filter and a transformer as are customarily employed in a UPS. In FIGS. 2 and 3, current from the supply 14 flows through the diode D4 to the circuit segment 18. In FIG. 4, the diode D4 is provided with a different location in the circuit such that the current flows directly from the supply 14 to the circuit segment 18. Also shown in FIGS. 2–4 are the supplies P1 and P2, and the diode D5 which couples current from the supply P1 to the coil of magnet 24. The current sensor 34 in FIG. 1 is connected in series with the coil of the magnet 24 as shown in FIGS. 2–4. The capacitors C1 and C2 of the energy storage cells 28 and 32, respectively, are provided with the respective voltage sensors 36 and 38 coupled across terminals of the capacitors C1 and C2.

The supply P1 is an AC/DC adjustable voltage and current power supply with a transformer. The supply P2 is an AC/DC power supply with a transformer. The step-up chopper 26 of FIG. 1 is implemented in FIGS. 2–4 by use of gate turn-off switch GTO1 connected between a node 48 and a power supply return line 50. The node 48 is located at the junction of terminals of the coil of the magnet 24 with the anode of the switch GTO1 and the anode of a diode D2. The function of the step-down chopper 30 of FIG. 1 is accomplished in FIGS. 2–4 by the gate turn-off switch GTO2 which connects between a terminal of the capacitor C1 and a node 52. The node 52 is at a junction of a terminal of the inductor L and cathode terminals of the switch GTO2 and the cathode of a diode D3. In FIGS. 2–4, a resistor R1 couples power from the supply P2 to the capacitor C1 for initially charging and recharging the capacitor C1.

With respect to the embodiment of the system 10 disclosed in FIG. 2, during normal operation, the utility supplies electrical power through the rectifier of the supply 14, the DC bus 16 and the inverter of the UPS circuit segment 18 to the utilization device 20. During conditions of utility outages or out-of-specification operation, the magnetic energy which has been stored previously in the superconducting magnet 24 is transformed into electrical energy that supplies the utilization device 20.

The step-down chopper 22, comprising the gate turn-off switch GTO3, further comprises the freewheeling diode D1. Terminals of the switch GTO3 and of the diode D1 and of the diode D5 are connected together at a circuit node 54 along with a terminal of the current sensor 34. During a charging of the magnet 24, the switch GTO1 is maintained in conduction. The on-off operation of the switch GTO3 controls the average voltage applied to the magnet 24, thereby to control its rate of charging. The path of current flow during conduction of the switch GTO3 is from the bus 16, through the switch GTO3, through the current sensor 34, through the coil of the magnet 24, through the switch GTO1 which is also in its conducting state, and back via the return line 50 to the supply 14. During the time when the switch GTO3 is off, in a state of nonconduction, the path for flow of current is through the coil of the magnet 24, through the switch GTO1 which is in its conducting state, and via the freewheeling diode D1 and current sensor 34, which completes the circuit allowing for continuous flow of the current in the coil of the magnet 24. In this way, the switch GTO1 in its conducting state and the diode D1 serve as a recirculation path allowing for circulation of current during the state of nonconduction of the switching GTO3. The controlled switches GTO1, GTO2, and GTO3 are shown in FIGS. 2–4 as gate turn-off thyristors, but the switches may be fabricated of other forms of controlled semiconductor devices, for example, as insulated gate bipolar junction transistors (IGBT), as bipolar transistors (BJT), and as field effect transistors (FET). Each of the switches GTO1–3 includes a gate terminal which is connected to a respective one of the controllers 42, 44, and 46 of FIG. 1 to establish their states of conduction and nonconduction. The charging mode for the magnet 24 ends when the magnet current reaches its desired value, usually full current. The switch GTO3 is in the non-conducting state upon completion of the charging mode.

The capacitor C3 serves as a filter for the AC/DC power supply P1. The supply P1 operates in a current regulated mode maintaining the magnet current at a desired level, usually full current. The voltage on the capacitor C3 is just sufficient to overcome the voltage drops through diode D5, in its conducting state, and through the switch GTO1 in its conducting state. The path for the magnet current extends from the supply P1 through the diode D5, through the current sensor 34, through the coil of the magnet 24, through the switch GTO1 in its conducting state, and back via the return line 50 to the supply P1.

With respect to the discharge phase in the operation of the magnet 24, step-up chopper 26 comprising the switch GTO1 further comprises the series diode D2. The capacitor C1 of the first energy storage cell 28 (FIG. 1) has been previously charged to the desired magnet discharge voltage by operation of the power supply P2, with current from the supply P2 being supplied via the charging resistor R1. The average magnet discharge voltage is controlled by the on-off duty cycle of the switch GTO1. When the switching GTO1 is in its non-conducting state, the current of the magnet 24 flows through the diode D2 into the capacitor C1 of the first energy storage cell 28, and then via the diode D1 back to the magnet 24. Further, during the magnet discharge, with the GTO1 in its conducting state, the magnet current circulates through the magnet 24, the switch GTO1 in its conducting state, and the diode D1. Thereby, the switch GTO1 of the recirculation path 56 directs the magnet current to the flow into the capacitor C1, or to recirculate via the recirculation path 56.

The magnet discharge voltage is essentially equal to the voltage on the capacitor C1 of the first energy storage cell 28 and is higher than the voltage on the DC bus 16 of the UPS portion of the system 10. This higher voltage reduces the magnet current and associated resistive losses during the maintaining of the fully charged state of the magnet 24. To obtain a voltage lower than that across the capacitor C1, the step-down chopper 30, which is composed of the switch GTO2 and the diode D3 is employed. The inductor L1 and the capacitor C2 provide the function of a filter of current outputted by the step-down chopper 30.

The average voltage across the capacitor C2 is controlled by the duty cycle of the switch GTO2. With the switch GTO2 in its conducting state, the path for current extends from capacitor C1, through the switch GTO2, through the inductor L1 and the capacitor C2, and back to the capacitor C1. If the switch GTO2 is in its non-conducting state, the path for the current in the inductor L1 extends through the inductor L1 and the capacitor C2 and back through the freewheeling diode D3. The voltage across the capacitor C2 of the second energy storage cell 32 is fed to the utilization device 20 via the series diode D4 and the inverter of the UPS circuit segment 18. In this way, the cyclical opening and closing of the switch GTO1 recirculation path 56 diverts a portion of the stored magnetic energy to the capacitor C1, and the cyclical opening and closing of the switch GTO2 is operative to transfer a portion of the energy stored in the capacitor C1 to the capacitor C2.

The embodiment of the system 10A as shown in FIG. 3 differs from the embodiment of the system 10 as shown in FIG. 2 in that, the connection of the supply 14 to the coil 24 via the switch GTO3 of FIG. 2 has been eliminated in FIG. 3. Accordingly, the supply P1 in FIG. 3 has been increased in its voltage capability, and now supplies the magnet charging current as well as maintaining the full current to the magnet 24. The power supply P1 controls the rate of rise of the magnet current during the magnet charging. It is noted that an increase of the DC voltage outputted by the supply P1 results in a decrease in the time necessary to bring the magnet 24 up to its fully charged current level. The path for the charging current is from the power supply P1 through the current sensor 34 and the magnet coil 24, and through the switch GTO1 in its conducting state, and back via the return line 50 to the supply P1. Upon attaining the desired current level in the magnet 24, this current level being usually the rated current, the supply P1 then reverts into a controlled current mode with control being provided by the controller 42 of FIG. 1. The output voltage of the supply P1 is just sufficient to overcome the voltage drop of the switch GTO1 in its conducting state, and any resistive losses in the electrical leads and cables. The remaining components of the circuitry of FIG. 3 function in the same manner as has been described for these components in FIG. 2.

The embodiment of the system 10B shown in FIG. 4 is substantially the same as that of FIG. 3 but differs by the inclusion of an additional power supply P3 which connects serially via a resistor R2 across the terminals of the capacitor C2. In addition, the diode D4 has been deleted from the bus 16 and is connected, in FIG. 4, between a terminal of the capacitor C2 and the bus 16. In its conducting state, the diode D4 conducts current from the capacitor C2 to the bus 16. The embodiment of FIG. 4 provides improved UPS system efficiency and, furthermore, allows the existing UPS bus (namely, the bus 16) to be unchanged upon an incorporation of the circuitry of the superconducting magnet 24 with the circuitry of the standard UPS. The supply P3 provides the function of precharging the capacitor C2 to the voltage of the DC bus 16. The series resistor R2 limits the charging current from the supply P3 into the capacitor C2. The series diode D4 conducts current from the capacitor C2, carrying energy which had been stored in the magnet 24, without being in series with the bus 16 as in the other embodiments. This results in an improvement in UPS system efficiency in the situation wherein the utility is supplying power to the utilization device 20 via the UPS supply 14 and the UPS circuit segment 18. In all three of the embodiments of FIGS. 2–4, the periodic opening and closing of the switches GTO1 and GTO2 is operative for the transference of stored energy via the capacitors C1 and C2, and the voltage of the capacitor C1 is greater than that of either the coil of the magnet 24 or the voltage across the capacitor C2.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A superconducting magnet energy storage system for applying power to a load, comprising:
   a superconducting magnet, and magnet current means for applying current to said magnet;

current feedback means responsive to current flow in said magnet for adjusting an average amplitude of current outputted by said magnet current means to said magnet;

a first capacitor for storing energy obtained from said magnet;

a second capacitor for storing energy for the load and being connected between said first capacitor and the load;

energy transfer means connecting said first capacitor to said magnet and to said second capacitor, said transfer means providing for a step-up of voltage from said magnet to said first capacitor and a step-down of voltage from said first capacitor to said second capacitor;

a recirculation path allowing current to recirculate through said magnet, said recirculation path including a switch for diverting current from said recirculation path via said energy transfer means to said first capacitor; and control means responsive to a voltage across said first capacitor for operating the switch of said recirculation path periodically with a duty cycle for extracting energy from said magnet to said first capacitor for maintaining a desired voltage at said first capacitor.

2. A system according to claim 1 further comprising primary power means coupled to an input source of electric power for applying current via a bus to the load, terminals of said second capacitor being connected via said bus to the load, and wherein said control means is operative to divert energy, via the switch of said recirculation path, through said first and said second capacitors to the load for maintaining a desired voltage at said bus upon a failure of said primary power means.

3. A system according to claim 2 further comprising a primary switch interconnecting a terminal of said primary power means with a terminal of said magnet for initiating current flow in said magnet, said primary switch being operated by said current feedback means with a periodic operation providing a duty cycle for establishing an initial value of current in said magnet.

4. A system according to claim 1 wherein said energy transfer means comprises a diode interconnecting a terminal of said magnet with a first terminal of said first capacitor, and a series circuit of a switch and an inductor interconnecting the first terminal of said first capacitor with a first terminal of said second capacitor, said second terminal of said second capacitor being connected to a terminal of said load; and wherein said control means is a first control means, said system further comprising a second control means responsive to a voltage across said second capacitor for operating the switch of said transfer means periodically with a duty cycle for transferring energy from said first capacitor to said second capacitor for maintaining a desired voltage at said load.

5. A system according to claim 4 further comprising primary power means coupled to an input source of electric power for applying current via a bus to the load, terminals of said second capacitor being connected via said bus to the load, and wherein said control means is operative to divert energy, via the switch of said recirculation path, through said first and said second capacitors to the load for maintaining a desired voltage at said bus upon a failure of said primary power means.

6. A system according to claim 5 further comprising a primary switch interconnecting a terminal of said primary power means with a terminal of said magnet for initiating current flow in said magnet, said primary switch being operated by said current feedback means with a periodic operation providing a duty cycle for establishing an initial value of current in said magnet.

7. A system according to claim 4 wherein said transfer means includes a coupling diode interconnecting the first terminal of said second capacitor with a terminal of the load.

8. A system according to claim 7 further comprising primary power means coupled to an input source of electric power for applying current via a bus to the load, terminals of said second capacitor being connected via said bus to the load, and wherein said control means is operative to divert energy, via the switch of said recirculation path, through said first and said second capacitors to the load for maintaining a desired voltage at said bus upon a failure of said primary power means.

9. A system according to claim 8 wherein a terminal of said primary power means is connected to a junction of said coupling diode with the first terminal of said second capacitor.

10. A system according to claim 8 further comprising charging means coupled to an input source of the electric power for applying current to said second capacitor, a terminal of said charging means being connected to the first terminal of said second capacitor.

11. A system according to claim 1 wherein said recirculation path further comprises a diode serially connected to the switch of said recirculation path, said diode providing a segment of said path which bypasses said current means.

12. A system according to claim 1 further comprising auxiliary power means coupled to an input source of electric power for applying current to said first capacitor, said auxiliary power means being connected to a junction of said transfer means and a first terminal of said first capacitor.

13. A method for extracting current from a superconducting magnet in a superconducting magnetic energy storage system for applying power to a load, the method comprising steps of:

applying current to the magnet to provide an initial value of current;

interconnecting a first capacitor and a second capacitor between the magnet and the load;

providing energy transfer means for interconnecting a terminal of the magnet with a first terminal of the first capacitor, said energy transfer means interconnecting successively the first terminal of the first capacitor with a first terminal of the second capacitor, and continuing with connection of the first terminal of the second capacitor to the load; and switching pulses of current from the magnet periodically into the first capacitor via the transfer means to transfer a quantum of energy from the magnet to the first capacitor, said transfer occurring via a diode allowing for a build-up of voltage across the first capacitor to be greater than the voltage at the magnet, there being a further step of transferring energy from the first capacitor to the second capacitor via a further switch and an inductor of the energy transfer means for establishing a voltage across the second capacitor which is lower than the voltage across the first capacitor.

* * * * *